US007297221B2

(12) United States Patent
Hikita

(10) Patent No.: US 7,297,221 B2
(45) Date of Patent: Nov. 20, 2007

(54) DECORATIVE MOLDED OBJECT HAVING COLOR DESIGN IMAGE AND METHOD OF PRODUCING THE SAME

(75) Inventor: Atsushi Hikita, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 363 days.

(21) Appl. No.: 10/717,538

(22) Filed: Nov. 21, 2003

(65) Prior Publication Data

US 2004/0101662 A1 May 27, 2004

(30) Foreign Application Priority Data

Nov. 26, 2002 (JP) ............................ 2002-342332

(51) Int. Cl.
*B44C 1/165* (2006.01)
*B32B 37/14* (2006.01)
*B32B 37/10* (2006.01)
*C09J 5/02* (2006.01)
*B44C 1/17* (2006.01)
*B32B 37/22* (2006.01)
*B32B 3/06* (2006.01)

(52) U.S. Cl. ...................... 156/240; 156/239; 156/247; 156/249; 156/307.3; 200/314

(58) Field of Classification Search .................. 156/82, 156/273.5, 230, 239, 240, 247, 249, 277, 156/307.1, 307.3; 200/314; 428/64
See application file for complete search history.

(56) References Cited

U.S. PATENT DOCUMENTS 4,042,090 A 8/1977 Hasebe et al.
4,082,635 A * 4/1978 Fritz et al. .................... 522/33
4,937,118 A * 6/1990 Inagaki et al. ............. 428/64.7
6,196,738 B1 * 3/2001 Shimizu et al. ............. 400/490

(Continued)

FOREIGN PATENT DOCUMENTS

EP 0419236 A2 3/1991

(Continued)

OTHER PUBLICATIONS

Roget's New Millenium Thesaurus, First Edition. 2006, Lexico Publishing Group, LLC. "transparent".*

(Continued)

*Primary Examiner*—Philip Tucker
*Assistant Examiner*—Sonya Mazumdar
(74) *Attorney, Agent, or Firm*—Rader, Fishman & Grauer PLLC

(57) ABSTRACT

A method of producing a decorative molded object which is a resin molded object decorated with a color design image representing a letter, a symbol, a figure, or the like, includes the steps of printing a color design image on an image carrying layer with an output apparatus that collectively outputs color design data to form a coloring agent layer for displaying the color design image on the substrate sheet, transferring the coloring agent layer on the substrate sheet onto a resin molded object to be decorated, peeling the substrate sheet with the transferred coloring agent layer left on the resin molded object to form a color design image layer on the resin molded object and curing, after application and deposition onto the color design image layer, a transparent resin liquid to thereby form a transparent resin layer.

1 Claim, 8 Drawing Sheets

U.S. PATENT DOCUMENTS

| | | | | |
|---|---|---|---|---|
| 6,451,143 | B2 * | 9/2002 | Nishi | 156/82 |
| 2001/0020973 | A1 | 9/2001 | Akada et al. | |
| 2002/0063109 | A1 * | 5/2002 | Hayashizaki | 216/28 |
| 2003/0026957 | A1 * | 2/2003 | Tang et al. | 428/195 |
| 2003/0221944 | A1 * | 12/2003 | Arai et al. | 200/512 |

FOREIGN PATENT DOCUMENTS

| | | | | |
|---|---|---|---|---|
| EP | 0803374 | A2 | | 10/1997 |
| EP | 0977225 | A2 | | 2/2000 |
| EP | 1081728 | A2 | | 3/2001 |
| EP | 1102292 | A2 | | 5/2001 |
| EP | 1367618 | A2 | | 12/2003 |
| JP | 06071784 | | | 3/1994 |
| JP | 07-032715 | | | 2/1995 |
| JP | 07-164728 | | * | 6/1995 |
| JP | 07164728 | A | * | 6/1995 |
| JP | 2000-231849 | | | 8/2000 |

OTHER PUBLICATIONS

"Translucent". Roget's II: The New Thesaurus (1995). Retrieved Oct. 20, 2006, from xreferplus. http://www.xreferplus.com/entry/751834.*

Roget's New Millenium Thesaurus, First Edition. Retrieved 2006, Lexico Publishing Group, LLC. "transparent".*

European Search Report dated Mar. 12, 2004.

* cited by examiner

DECORATIVE MOLDED OBJECT HAVING COLOR DESIGN IMAGE AND METHOD OF PRODUCING THE SAME

BACKGROUND OF THE INVENTION

1. Field of the Invention

The present invention relates to a decorative molded object which has a color design image such as a letter, a symbol, or a pattern displayed in color, and is incorporated in a part of various products to exert a display function and a decoration function, and to a method of producing the same. In particular, the present invention relates to a key top for a push-button switch used for input operation portions of various electronic instruments such as mobile telephones, mobile data terminals, and AV equipment.

2. Description of the Related Art

There have been known various decorative molded objects each of which has a color design image such as a letter, a symbol, or a pattern displayed in color, and is incorporated in a part of various products to exert a display function and a decoration function. For instance, a mobile telephone is taken as an example. A key top for a push-button switch used in a mobile telephone is a decorative molded object in which a key top made of resin is provided with a color design image such as a letter or a pattern. A case constituting a mobile telephone itself is also a decorative molded object having a color design image provided that the case has a pattern drawn on its surface.

Each of those decorative molded objects is formed by forming a color design image on a resin surface, followed by molding into a predetermined shape, or is formed by molding a resin into a predetermined shape, followed by printing or applying a color design image. A description will be made by taking a key top for a push-button switch used in an electronic instrument such as a mobile telephone as an example. A display portion, which is provided on the surface of the key top for a push-button switch and is composed of a color design image such as a letter or a pattern, is mainly formed by applying screen printing, pad printing, or the like to a key top main body made of resin.

However, in accordance with recent miniaturization and multi-functionality of electronic instruments, miniaturization of decorative molded objects such as a push-button has been demanded, and there has been a growing need for displaying, in a limited space, a larger number of letters, numeric characters, or symbols, or a figure, a design pattern, or the like which is complicated and composed of multiple colors. However, in the conventional approach such as screen printing or pad printing, a printing plate has been necessary for each color, and a sophisticated printing technique has been necessary for alignment of each color. Therefore, a quick response involved in diversification of a design and shortening of cycles was difficult to be made, so that the needs for simplification of a production step, a cost reduction, and an increase in resolution could not be satisfied.

On the other hand, as a method of forming a display portion alternative to the conventional printing method, there is a method which includes laminating a printing sheet obtained by printing graphics on a resin sheet by means of a printer onto a resin molded object, and JP 2000-231849 A discloses a similar technique. However, the method requires a post-step of cutting the printing sheet along an outer peripheral shape of each key top by using a carbon dioxide laser or a punching blade. In addition, a thick printing sheet is cut, so that there arises a problem in that a burr tends to be produced at a cut surface. Furthermore, the printing sheet is integrated into the key top, which is not suitable regarding a response to a reduction in thickness of the key top for a push-button switch.

JP 2000-231849 A

In view of the above, as a method with which a letter, a pattern, or the like that has been difficult to be displayed at a high resolution with the conventional printing method such as screen printing or pad printing can be clearly displayed at a high resolution, and which responds to a demand for a reduction in thickness that has been difficult in the method of laminating a printing sheet onto a resin molded object, the following method has been attempted. The method includes: printing a color design image representing a letter, a symbol, a figure, or the like on a substrate sheet by means of an output apparatus for collectively outputting color design data such as a printer; and transferring the resultant color design image onto a resin molded object. However, there have been problems in that a bad combination of a color printer and a substrate sheet results in a partial printing running off the letter edge in the printed image, and that, even if a high-quality image is printed, transfer is not performed with satisfaction at the stage of transferring the image onto the resin molded object. Moreover, for example, there has been a problem in that, even if the steps up to the transfer are performed with satisfaction, the obtained color design image becomes yellowish or the like, resulting in poor transparency.

The inventors of the present invention have made extensive studies in order to solve those problems, and have found that, by conducting processing onto a printing surface side of a substrate sheet and processing onto an image surface in combination, a design image can be obtained, which has a high resolution such as fineness of a drawing or smoothness of image quality, and which is clear and excellent in transparency. Thus, the inventors of the present invention have completed the present invention on the basis of this finding.

SUMMARY OF THE INVENTION

The present invention provides a method of producing a decorative molded object which is a resin molded object decorated with a color design image representing a letter, a symbol, a figure, or the like, the method including steps of: printing a color design image on an image carrying layer, which is porous and is arranged on a substrate sheet, with an output apparatus that collectively outputs color design data to form a coloring agent layer for displaying the color design image on the substrate sheet; transferring the coloring agent layer on the substrate sheet onto a resin molded object to be decorated; peeling the substrate sheet with the transferred coloring agent layer left on the resin molded object to form a color design image layer on the resin molded object; and curing, after application and deposition onto the color design image layer, a transparent resin liquid to thereby form a transparent resin layer.

According to the method of producing a decorative molded object, the steps of: printing a color design image on an image carrying layer, which is porous and is arranged on a substrate sheet, with an output apparatus that collectively outputs color design data to form a coloring agent layer for displaying the color design image on the substrate sheet; transferring the coloring agent layer on the substrate sheet onto a resin molded object to be decorated; and peeling the substrate sheet with the transferred coloring agent layer left on the resin molded object to form a color design image layer on the resin molded object are performed. Therefore, a large number of letters, numeric characters, figures, or symbols, or a pattern or the like having a complex configuration and multiple colors can be clearly displayed in a small area portion on the surface of the resin molded object. In addition, a decorative molded object can be obtained, which can be stably produced irrespective of a worker, and which is inexpensive and has high quality. In particular, a display layer for displaying a letter or an image can be reduced in thickness because the coloring agent layer is transferred with the substrate sheet peeled off. Furthermore, there is no need to cut out or punch the substrate sheet in the post-step. Therefore, a decorative molded object which is thin, has few burrs, and has high quality can be obtained.

Further, the method includes the step of forming a transparent resin layer by curing a transparent resin liquid after application and deposition of the transparent resin liquid onto the color design image layer obtained by transferring the coloring agent layer onto the resin molded object. Therefore, the transparent resin liquid is applied from a face opposite to the face printed by the output apparatus. As a result, the transparent resin liquid sufficiently permeates into the color design image layer, so that a decorative molded object which causes no light scattering in the color design image layer and has an image excellent in transparency can be obtained. Here, the term "deposit" refers not to a state where the transparent resin layer is merely mounted or laminated on the color design image layer but to a state where a part of the transparent resin penetrates into the color design image layer and a transparent resin layer 5 roots in a color design image layer 3.

In the present specification, for one thing, good transparency requires that a transmittance of visible light be at least 60% at a wavelength of 500 nm in the color design image layer. Alternatively, good transparency means a state where an image can be seen without being perceived as whitish or yellowish. When the case where the color design image layer is seen by placing the layer on a white ground is compared with the case where the color design image layer is seen by placing the layer on a colorless and transparent ground, the image may be seen differently. When the color design image layer seen by placing the layer on a colorless and transparent ground is inferior to that seen by placing the layer on a white ground, the transparency of the image layer can be said to be poor.

Furthermore, the present invention provides method of producing a decorative molded object which is a resin molded object decorated with a color design image representing a letter, a symbol, a figure, or the like, the method including the steps of: printing a color design image on an image carrying layer, which is porous and is arranged on a substrate sheet, with an output apparatus that collectively outputs color design data to form a coloring agent layer for displaying the color design image on the substrate sheet; curing, after application and deposition onto the coloring agent layer, a transparent resin liquid to thereby form a transparent resin layer; transferring the transparent resin layer and the coloring agent layer on the substrate sheet onto a resin molded object to be decorated; and peeling the substrate sheet with the transferred coloring agent layer left on the resin molded object to form a color design image layer on the resin molded object.

According to the method of producing a decorative molded object, the steps of: printing a color design image on an image carrying layer, which is porous and is arranged on a substrate sheet, with an output apparatus that collectively outputs color design data to form a coloring agent layer for displaying the color design image on the substrate sheet; curing, after application and deposition onto the coloring agent layer, a transparent resin liquid to thereby form a transparent resin layer; transferring the transparent resin layer and the coloring agent layer on the substrate sheet onto a resin molded object to be decorated; and peeling the substrate sheet with the transferred coloring agent layer left on the resin molded object to form a color design image layer on the resin molded object are included. Therefore, a large number of letters, numeric characters, figures, or symbols, or a pattern or the like having a complex configuration and multiple colors can be clearly displayed in a small area portion on the surface of the resin molded object. In addition, a decorative molded object can be obtained, which can be stably produced irrespective of a worker, and which is inexpensive and has high quality. In particular, a display layer for displaying a letter or an image can be reduced in thickness because the coloring agent layer is transferred with the substrate sheet peeled. Furthermore, there is no need to cut out or punch the substrate sheet in the post-step. Therefore, a decorative molded object which is thin, has few burrs, and has high quality can be obtained.

In particular, after the step of printing a color design image on an image carrying layer, which is porous and is arranged on a substrate sheet, with an output apparatus that collectively outputs color design data to form a coloring agent layer for displaying the color design image on the substrate sheet, the method includes the step of curing, after application and deposition onto the coloring agent layer, a transparent resin layer to thereby form a transparent resin layer. Therefore, a decorative molded object can be obtained, which causes no light scattering in the coloring agent layer and which has an image with high transparency when the color design image layer is obtained through transfer.

Furthermore, the present invention provides the method of producing a decorative molded object in which the image carrying layer is composed of a porous material having, as a bonding phase, inorganic fine particles bound with each other with a binder resin.

According to the method of producing a decorative molded object, the image carrying layer is composed of a porous material having, as a bonding phase, inorganic fine particles bound with each other with a binder resin. Therefore, a coloring agent (colorant) such as ink or toner adheres or adsorbs well, and an image excellent in resolution can be reproduced. In addition, a color design image layer which is excellent in water resistance and weatherability, and in which a coloring agent is protected by the image carrying layer can be obtained. At the same time, the coloring agent layer can be precisely transferred onto the resin molded object side at the time of transfer. As a result, a high-quality decorative molded object without partial printing running off the letter edge can be obtained.

Then, in this case, if the image carrying layer is perforated with many longitudinal pores opening in the direction perpendicular to the substrate sheet plane, foil cutting property of the image carrying layer is satisfactory and transfer property at the time of transfer is further improved. In addition, in the case where an ink jet printer is used, an ink adsorbing force is excellent and ink is instantaneously adsorbed. Thus, a decorative molded object having an image with a high resolution and high quality and without liquid drop or the like can be obtained.

Furthermore, the present invention provides the method of producing a decorative molded object, further including the step of curing the transparent resin liquid, which is an active energy ray curing type resin liquid, by applying an active energy ray thereto after depositing the transparent resin liquid onto the color design image layer or the coloring agent layer.

The method includes the step of curing the transparent resin liquid, which is an active energy ray curing type resin liquid, by applying an active energy ray thereto after depositing the transparent resin liquid onto the color design image layer or the coloring agent layer. As a result, the resin liquid is not cured until an active energy ray is applied thereto. Therefore, there is a sufficient time period until the resin liquid is deposited onto the color design image layer. Thus, a color design image layer with high transparency can be obtained.

Furthermore, the present invention provides the method of producing a decorative molded object, further including the step of leaving, after application, the transparent resin liquid, which is an active energy ray curing type resin liquid, for a predetermined time period determined according to a viscosity of the transparent resin liquid.

A time required to cure the resin can be changed freely because an active energy ray curing type resin is used. As a result, an active energy ray curing type resin liquid with a wide viscosity range can be used. In addition, a printing method or a coating method can be adopted from a wide range. Then, after application, the transparent resin liquid is left for the time period determined according to the viscosity of the transparent resin liquid. Therefore, sufficient permeation of the resin liquid into the color design image layer can be achieved irrespective of the viscosity of the resin liquid. Thus, a color design image with high transparency can be obtained.

Furthermore, the present invention may be the method of producing a decorative molded object, further including the step of leaving, after application, the transparent resin liquid, which is a two-liquid curing type resin liquid having a viscosity of $1\times10^{-3}$ Pa·s to 20 Pa·s at 25° C., for a time period within a range of 0.1 seconds to 60 minutes determined according to the viscosity of the transparent resin liquid, to thereby complete curing of the two-liquid curing type resin liquid. The method includes the step of leaving, after curing, the two-liquid curing type resin liquid for a time period within 0.1 seconds to 60 minutes determined according to the viscosity of the two-liquid curing type resin liquid having the viscosity of $1\times10^{-3}$ Pa·s to 20 Pa·s at 25° C. As a result, sufficient permeation, of the two-liquid curing type resin liquid into the color design image layer can be achieved according to its viscosity. Thus, a color design image with high transparency can be obtained.

Furthermore, the present invention provides the method of producing a decorative molded object, further including the step of transferring the coloring agent layer onto a back surface of the resin molded object which is made of a transparent or semi-transparent resin.

According to the method of producing a decorative molded object, performed is the step of transferring the coloring agent layer onto a back surface of the resin molded object which is made of a transparent or semi-transparent resin through application of an adhesive to the back surface. As a result, a color design image outputted from a printer can be visually recognized from the front surface side (printing surface side) even if the coloring agent layer is transferred. Thus, an image with a high resolution and high quality representing a letter, a symbol, a pattern, or the like can be displayed. Ink permeation into the image carrying layer formed on the substrate sheet is present to some extent on the side opposite to the printing surface side. Thus, the surface into which ink permeates is to be visually recognized, so that a resolution is expected to be somewhat poor.

Furthermore, the present invention provides the method of producing a decorative molded object, further including the step of forming an coloring auxiliary layer for complementing a color such as a metallic color (for example, a gold color or a silver color) or a white color on the resin molded object or on the transparent resin layer before or after transferring the coloring agent layer onto the resin molded object.

According to the method of producing a decorative molded object, the step of forming an coloring auxiliary layer for complementing a color such as a metallic color (for example, a gold color or a silver color) or a white color on the resin molded object or on the transparent resin layer is performed. As a result, an image having a color that is generally difficult to reproduce by using a color printer that uses CMYK ink (for example, a metallic color such as a gold color or a silver color, a white color, or a pearl color) can be readily formed. Thus, a decorative molded object which is excellent in image quality and design, and has good color reproducibility can be obtained.

Furthermore, the present invention provides the method of producing a decorative molded object in which the output apparatus for collectively outputting color design data employs an ink jet printing method as its printing method.

According to the method of producing a decorative molded object, an ink jet printer is used as the output apparatus for collectively outputting color design data. As a result, full-color and high-speed printing can be readily realized, and color design data can be imaged instantaneously. In addition, a decorative molded object having an image that has image quality close to that of a photograph and is excellent in resolution can be obtained. Moreover, the image carrying layer is transferred while the ink for an inkjet printer is permeated into a porous material. Therefore, a decorative molded object having a color design image with excellent weatherability and color developability can be obtained.

Furthermore, the present invention provides the method of producing a decorative molded object in which the resin molded object is a key top main body of a key top for a push-button switch.

If the resin molded object is a key top for a push-button switch, another kind of key top for a push-button switch can be used in one model. Therefore, different color design image layers forming various display layers can be easily manufactured, and another kind of key top for a push-button switch can be manufactured easily and inexpensively.

Furthermore, the present invention provides a decorative molded object which is a resin molded object decorated with a color design image representing a letter, a symbol, a figure, or the like, the decorative molded object including, on the resin molded object: a color design image layer which is porous and to which a coloring agent for representing a color design image is adhered; and a transparent resin layer which is laminated on the color design image layer while penetrating into a gap of the color design image layer.

According to the present invention, there is provided the decorative molded object including, on a resin molded object: a color design image layer which is porous and to which a coloring agent for representing a color design image is adhered; and a transparent resin layer which is laminated on the color design image layer while penetrating into a gap of the color design image layer. Therefore, the color design image to be formed can be obtained as an image which has a good resolution and which is clearly printed. In addition, the resultant color design image does not become whitish or yellowish and can be obtained as an image with high transparency because the transparent resin layer penetrates into the gap of the color design image layer. Therefore, a decorative molded object excellent in visibility and design property of a display can be obtained.

Furthermore, the present invention provides the decorative molded object in which the color design image layer is obtained by depositing a coloring agent outputted from an output apparatus for collectively outputting color design data onto a porous layer composed of inorganic fine particles bound with each other with a binder resin.

According to the decorative molded object of the present invention, a decorative molded object having various color design images can be obtained simply and easily because the color design image layer can be outputted and obtained from the output apparatus for collectively outputting color design data. Moreover, the color design image layer is obtained by depositing the coloring agent outputted the output apparatus onto the porous layer composed of inorganic fine particles bound with each other with a binder resin. Therefore, the color design image to be formed can be obtained as an image which has a good resolution and which is clear.

Furthermore, the present invention provides the decorative molded object in which the transparent resin layer is a cured layer of an active energy ray curing type resin liquid. The transparent resin layer is formed of an active energy ray curing type resin liquid. Thus, an increase or decrease in resin volume before and after curing is small, and the gap of the color design image layer can be readily filled. Therefore, a color design image layer excellent in transparency can be obtained. In addition, the transparent resin layer can also serve as a bonding layer for bonding the decorative molded object to another member.

Furthermore, the present invention provides the decorative molded object in which the transparent resin layer is a cured layer of a two-liquid curing type resin liquid having a viscosity of $1\times10^{-3}$ Pa·s to 20 Pa·s at 25° C. Since the transparent resin layer is formed of a two-liquid curing type resin liquid having a viscosity of $1\times10^{-3}$ Pa·s to 20 Pa·s at 25° C., an increase or decrease in resin volume before and after curing is small, and the gap of the color design image layer can be readily filled. Therefore, a color design image layer excellent in transparency can be obtained. In addition, the transparent resin layer can also serve as a bonding layer for bonding the decorative molded object to another member.

Furthermore, the present invention provides the decorative molded object in which the resin molded object is made of a transparent or semi-transparent resin, and the resin molded object has the color design image layer on a back surface thereof. Since the resin molded object is made of a transparent or semi-transparent resin, and the resin molded object is provided with the color design image layer on a back surface thereof, a decorative molded object in which a color design image can be visually recognized throughout the resin molded object, and which is excellent in design properties can be obtained.

Furthermore, the present invention provides the decorative molded object in which the resin molded object or the transparent resin layer is provided with an coloring auxiliary layer for complementing a color such as a metallic color (for example, a gold color or a silver color) or a white color. Provision of an coloring auxiliary layer for complementing a color such as a metallic color (for example, a gold color or a silver color) or a white color enables a decorative molded object having a color design image of a color that is generally difficult to reproduce by using a color printer that uses CMYK ink (for example, a metallic color such as a gold color or a silver color, a white color, or a pearl color) to be obtained. In addition, the decorative molded object to be obtained is excellent in image quality and design, and has good color reproducibility.

Furthermore, the present invention provides the decorative molded object in which the resin molded object is a key top main body of a key top for a push-button switch. By using the decorative molded object for the key top main body, a key top for a push-button switch excellent in resolution, design property, color reproducibility, or the like can be obtained.

The content of the present invention is not limited to the above description, and an object, an advantage, a feature, and an application of the present invention are further clarified by the following description with reference to the accompanying drawings. Furthermore, it is to be understood that all the appropriate modifications without departing from the spirit of the present invention are included in the scope of the present invention.

DETAILED DESCRIPTION OF THE PREFERRED EMBODIMENTS

Hereinafter, description will be made of an example of an embodiment of a decorative molded object and a method of producing the same according to the present invention. In this embodiment, as a specific example thereof, a key top for a push-button switch and a method of producing the same will be described.

Figure 1:
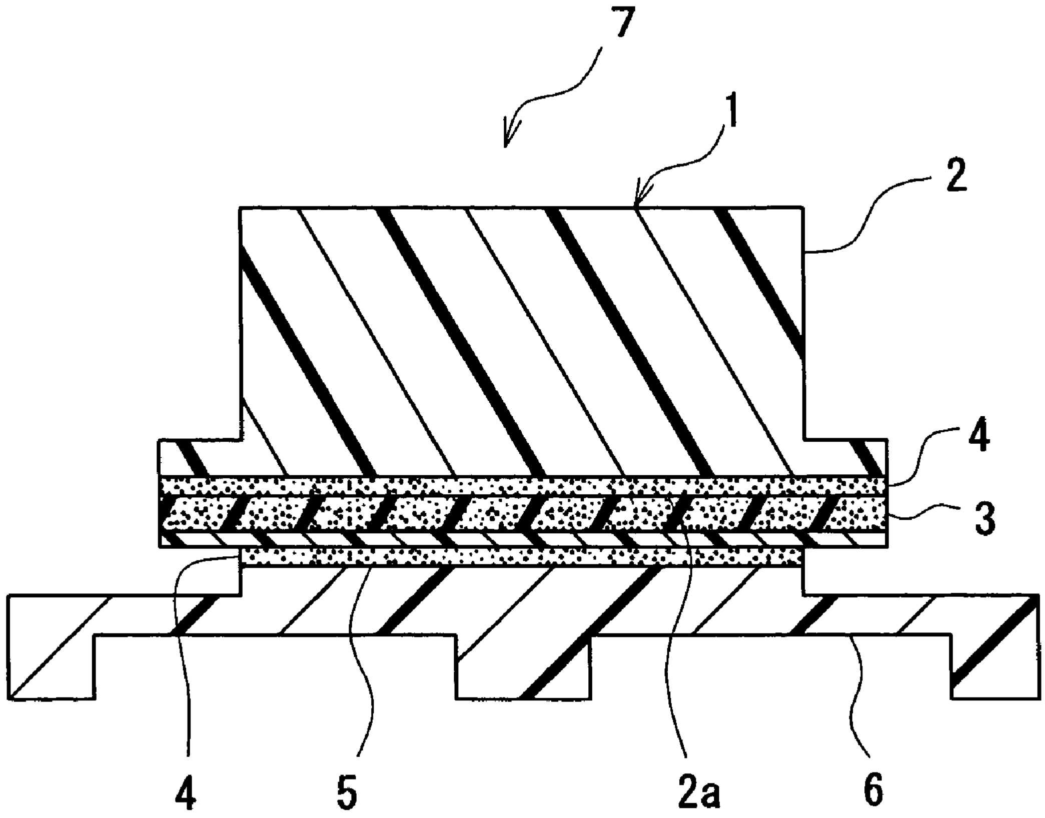
FIG. 1 is a cross sectional view of a key pad with a key top for a push-button switch using a key top for a push-button switch according to a first embodiment.

Description of Key Top for Push-button Switch of FIG. 1

FIG. 1 shows an example of a key top for a push-button switch. A key top 1 for a push-button switch is structured as follows. A color design image layer 3 is laminated on a back surface 2*a* of a key top main body 2 made of a transparent or semi-transparent resin via a bonding layer 4, and a transparent resin layer 5 is formed on the color design image layer 3. The key top 1 for a push-button switch is integrated into a base sheet 6 made of a rubber-like elastic body to serve as a key pad 7 with a key top for a push-button switch.

Description of Method of Producing Key Top for Push-button Switch of FIGS. 2 to 8

Figure 2:
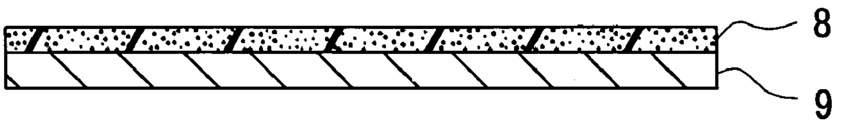
FIG. 2 is a cross sectional view showing a substrate sheet having an image carrying layer used in a production process of the key top for a push-button switch shown in FIG. 1.
Figure 3:
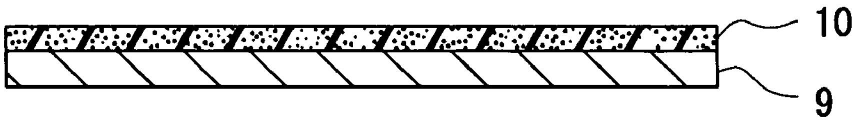
FIG. 3 is a cross sectional view showing the substrate sheet having a coloring agent layer formed thereon in the production process of the key top for a push-button switch shown in FIG. 1.

Subsequently, a method of producing the key top 1 for a push-button switch is described. First, on a substrate sheet 9 having an image carrying layer 8 that is porous as shown in FIG. 2, a color design image is printed on the image carrying layer 8 by means of an output apparatus (not shown) for collectively outputting color design data such as a printer. This action forms a coloring agent layer 10 in which the color design image is integrated into the image carrying layer 8 as shown in FIG. 3.

Figure 4:
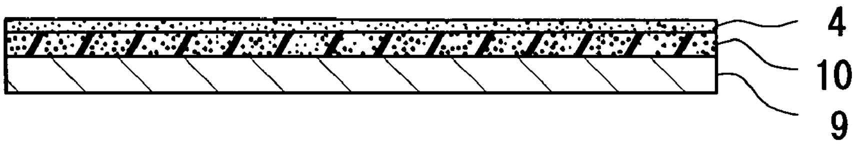
FIG. 4 is a cross sectional view showing the substrate sheet having a bonding layer formed on the coloring agent layer in the production process of the key top for a push-button switch shown in FIG. 1.
Figure 5:
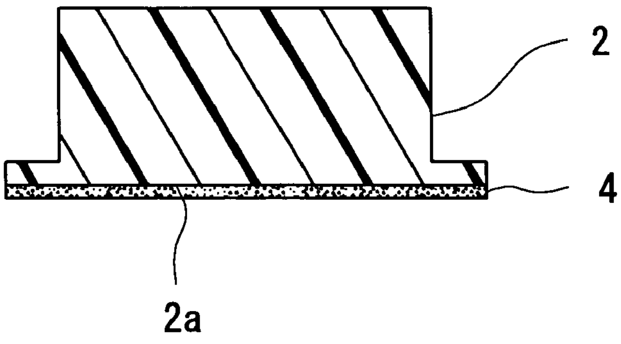
FIG. 5 is a cross sectional view showing a key top main body having a bonding layer formed thereon in the production process of the key top for a push-button switch shown in FIG. 1.

Then, as shown in FIG. 4, an adhesive is applied onto the surface of the coloring agent layer 10 to form the bonding layer 4. Alternatively, as shown in FIG. 5, an adhesive 4 is applied onto the back surface 2*a* of the key top main body 2.

Figure 6:
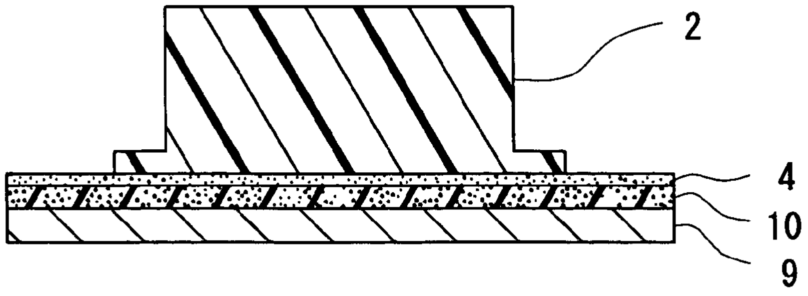
FIG. 6 is a cross sectional view showing a state where the key top main body is bonded to the substrate sheet in the production process of the key top for a push-button switch shown in FIG. 1.
Figure 7:
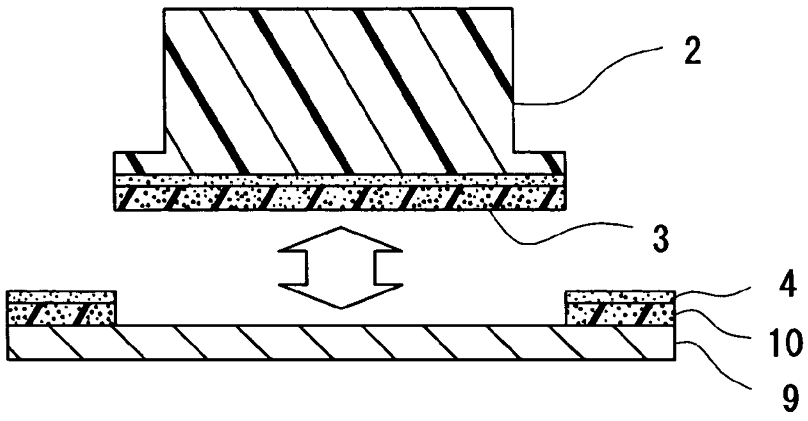
FIG. 7 is a cross sectional view showing a state where the coloring agent layer is transferred and a color design image layer is formed on a key top main body side in the production process of the key top for a push-button switch shown in FIG. 1.

Description will be made of the case where the adhesive 4 is applied onto the surface of the coloring agent layer 10. Next, as shown in FIG. 6, the substrate sheet 9 is brought into press-contact with the key top main body 2. Then, as shown in FIG. 7, the coloring agent layer 10 is transferred onto the key top main body 2 by using a method such as hot stamping, followed by peeling the substrate sheet 9 off. Also in the case where the adhesive 4 is applied onto the back surface 2*a* of the key top main body 2 as shown in FIG. 5, a procedure similar to that shown in FIGS. 6 and 7 may be adopted.

Figure 8:
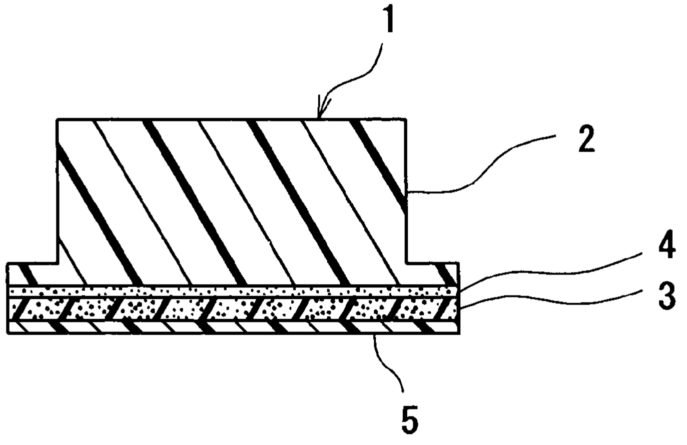
FIG. 8 is a cross sectional view showing a state where a transparent resin layer is laminated on the color design image layer in the production process of the key top for a push-button switch shown in FIG. 1.

Then, a transparent resin liquid having a predetermined viscosity is applied onto the color design image layer 3 obtained by transferring the coloring agent layer 10 onto a side of the key top main body 2, and is left for a predetermined time period determined according to the kind and viscosity of the transparent resin liquid. Then, the transparent resin liquid is allowed to permeate into a porous material forming the color design image layer 3, and the transparent resin liquid is deposited onto the color design image layer 3. Thus, the transparent resin layer 5 is formed as shown in FIG. 8.

The key top 1 for a push-button switch of this embodiment can be produced through the above steps. Furthermore, by bonding and curing the key top 1 for a push-button switch with the base sheet 6, the key pad 7 with a key top for a push-button switch shown in FIG. 1 can be obtained.

Substrate Sheet 9

A substrate sheet 9 serves as a substrate on which the coloring agent layer 10 for displaying a color design image is to be formed, and the sheet is peeled off after the coloring agent layer 10 is transferred onto the key top main body 2. Therefore, the sheet itself is not a constituent of the key top 1 for a push-button switch. A resin film or paper can be used for the substrate sheet 9. Examples of the resin film include a polyethylene terephthalate film, a polybutylene terephthalate film, a polyurethane film, a polyamide film, a polypropylene film, a polystyrene film, a fluorine film, an ionomer film, a polycarbonate film, and a polyvinyl chloride film. In addition, examples of the paper include art paper and coat paper. The substrate sheet 9 to be used is selected from the above resin films or paper depending on the kind of output apparatus to be used and on properties of a coloring agent such as ink or toner to be used in the output apparatus. Therefore, a thickness of the substrate sheet 9 can be selected and determined on the basis of a printable range of the output apparatus to be used.

Image Carrying Layer 8

Formed on the surface of the substrate sheet 9 is the image carrying layer 8 which is made of a porous material to allow a coloring agent such as ink or toner to adhere thereto and deposit thereon with ease (FIG. 2). The image carrying layer 8 can be formed of a porous material having, as a bonding phase, inorganic fine particles bound with each other with a binder resin. It is preferable that the image carrying layer 8 be perforated with many longitudinal pores opening in the direction perpendicular to the substrate sheet 9. This is because when printing is performed using a printer, ink permeates into the pores of the image carrying layer 8. As a result, an excellent ink absorbency is achieved while an ink flow in the horizontal direction of the substrate sheet 9 can be suppressed, so that a dot of a nearly perfect circular shape can be obtained. Therefore, the color design image layer 3 with a high resolution can be obtained. In addition, the image carrying layer 8 suppresses generation of a burr at the time of transfer, and also serves as a peeling layer for facilitating peeling off from the substrate sheet 9.

For instance, a fine particle of an inorganic oxide or a hydroxide thereof can be used as an inorganic fine particle that forms the image carrying layer 8. Examples of the fine particle include silica, alumina, an alumina hydrate, and a silica-alumina composite. The image carrying layer 8 formed by using boehmite which is an aggregate of an alumina hydrate, or a silica-alumina composite sol offers a large pore volume and a large average pore size, and is excellent in ink absorbency. In addition, the image carrying layer 8 is excellent in transparency, water resistance, and gloss, and is thus preferable. An average particle size of the inorganic fine particle is preferably 100 to 1000 nm, more preferably 200 to 800 nm. In order to enhance transparency of the image carrying layer 8, a fine particle size needs to be reduced to such an extent as to be nearly free of light scattering. However, for the above preferable particle size, the image carrying layer 8 becomes opaque white, and thus a sufficient light transmittance can be achieved even if the layer is used for an illumination type key top. With regard to a shape of the inorganic fine particle, if a structure is adopted in which a nonspherical fine particle is oriented to form a linear pore, that is, the image carrying layer 8 is perforated with many longitudinal pores opening in the direction perpendicular to the substrate sheet 9, ink absorbency is further increased, and the shape of a dot is closer to a perfect circle, which is preferable.

Furthermore, examples of the binder for binding inorganic fine particles include: starch and a modified product thereof; polyvinyl alcohol and a modified product thereof; a cellulose derivative; a styrene-butadiene rubber latex; a nitrile-butadiene rubber latex; and polyvinyl pyrrolidone. Of those, polyvinyl alcohol and a modified product thereof are preferable in that polyvinyl alcohol and a modified product thereof are excellent in ink affinity, offer good affinity with the adhesive (bonding layer 4) used at the time of transfer, and are excellent in transfer property.

Inorganic fine particles are fixed with a binder to form a porous layer. With regard to a pore structure of the layer, an average pore size is preferably 3 to 25 nm, and a pore volume is preferably 0.3 to 2.0 $cm^3/g$. If the average pore size is less than 3 nm, or if the pore volume is less than 0.3 $cm^3/g$, it becomes difficult for the ink to permeate into a pore. Moreover, if the average pore size exceeds 25 nm, and if the pore volume exceeds 2.0 $cm^3/g$, formation of a dot of a nearly perfect circular shape becomes difficult. Therefore, the above ranges are preferable.

The image carrying layer 8 offers favorable effects in hot stamping in addition to improvement in image quality. That is, when a predetermined portion of the coloring agent layer 10 is thermally transferred to the key top side, if the image carrying layer 8 is not provided, a boundary surface between an area to be transferred and an area not to be transferred is not sharp, resulting in a state where so-called foil cutting property is poor. On the other hand, if the image carrying layer 8 is provided, a surface to be transferred is sharply separated from a surface not to be transferred. Moreover, the coloring agent layer 10 is neatly separated from the substrate sheet 9, and thus color remnants hardly occur.

A thickness of the image carrying layer 8 is preferably of such thickness that allows a coloring agent such as ink printed by a printer to permeate therethrough, and the thickness is ordinarily 2 to 50 μm, preferably 7 to 45 μm. If the thickness is less than 7 μm, ink permeation may be insufficient. If the thickness is greater than 45 μm, satisfactory transfer is not performed in some cases.

Output Apparatus for Color Design Image

A representative example of an output apparatus for outputting color design data in accordance with which a color design image is printed on the substrate sheet 9 is a printer. As a printer, printers of various printing methods such as a thermal transfer method, a sublimation method, an ink jet method, and a laser exposure thermal development transfer method are available. However, an ink jet printer is preferably used. This is based on the following two reasons. One reason is that an ink jet printer enables full-color image formation and high-speed printing to be readily performed, and further, enables an image of photographic quality which is excellent in resolution to be obtained. The other reason is as follows. By providing the image carrying layer 8, even if ink for an ink jet printer poor in humidity resistance, weatherability, color developability, scratch resistance, or the like is used, the ink permeates into a porous material and the porous material is transferred. Therefore, the color design image layer 3 excellent in humidity resistance, weatherability, color developability, scratch resistance, or the like can be formed.

Materials that correspond to various output apparatuses can be used as coloring agents such as ink and toner for representing a color design image. However, ordinarily used is ink or toner obtained by dispersing or dissolving a pigment or a dye in a binder resin. In order to represent a color, CMY (Cyan, Magenta, Yellow), CMYK (Cyan, Magenta, Yellow, Black), or RGB (Red, Green, Blue) coloring agents are employed as those coloring agents. Those coloring agents are capable of representing full colors by a collective output from a color printer and of finely and clearly displaying, in a small area portion of a key top, a large number of letters, numeric characters, or symbols, or a figure, a color pattern, or the like which is complex. Therefore, a color design image with a high resolution is formed, the resolution being fineness of a drawing or smoothness of image quality.

Ink from a printer adheres or adsorbs to the image carrying layer 8 provided on the substrate sheet 9, and thus the coloring agent layer 10 is obtained. Then, the coloring agent layer 10 is transferred to be brought into contact with the key top main body 2 side, thereby forming the color design image layer 3. Upon transfer of the coloring agent layer 10, peeling off may be performed at an interface between the image carrying layer 8 and the substrate sheet 9, or peeling off may be performed within the image carrying layer 8. The image carrying layer 8 had better not remain on the substrate sheet 9 in terms of resolution and transfer property.

Bonding Layer 4

Various bonding materials, adhesives, solvent vaporizing type (evaporation drying type) ink, or the like can be used for the bonding layer 4 for bonding the coloring agent layer 10 to the key top main body 2. Examples of the solvent vaporizing type ink include solvent vaporizing type ink obtained by dissolving, in an organic solvent, one type of resins such as an acrylic resin, a vinyl chloride resin, a vinyl acetate resin, a polyester resin, a urethane resin, and an epoxy resin, or a mixture of two or more types of the resins. Examples of the organic solvent include cyclohexanone, toluene, isophorone, xylene, ethyl acetate, isobutyl acetate, diethylene glycol monoethyl ether acetate, and diethylene glycol monobutyl ether acetate. Addition of a small amount of a silicone based leveling agent, a modified silicone based leveling agent, a fluorine based leveling agent, or the like results in an increase in the leveling properties of the bonding layer 4. Furthermore, a hot-melt adhesive can be used for thermally transferring the coloring agent layer 10. Examples of the hot-melt adhesive include an acrylic hot-melt adhesive, a vinyl chloride based hot-melt adhesive, a polyester based hot-melt adhesive, and a urethane based hot-melt adhesive. Of those hot-melt adhesives, an adhesive having a glass transition temperature of 50 to 100° C. is preferable because of its excellent transfer property.

A bonding material or an adhesive serving as the bonding layer 4 is preferably transparent or semi-transparent to satisfy the need for transmitting light for an illumination type key top. However, the bonding material or the adhesive may be colored, which further broadens a range of design. Furthermore, addition of an additive such as an ultraviolet absorber or a stabilizer can improve weatherability to a large extent. The bonding material or the adhesive is uniformly applied partially or entirely onto the key top main body 2 or onto the coloring agent layer 10 formed on the substrate sheet 9 through printing or the like. A thickness of the bonding layer 4 is preferably 1 to 30 μm. This is because the bonding layer needs to have an adhesive force with which the coloring agent layer 10 can be transferred onto the key top main body 2.

Transferring Method

As a method of transferring the coloring agent layer 10 onto the key top main body 2, heat transfer is carried out as well as press bonding transfer. A condition for heat transfer depends on the material and thickness of the bonding layer 4, the key top main body 2 etc., air temperature, or the like. For instance, when performing hot stamping on a surface in which the bonding layer 4 containing polyester, vinyl chloride, or the like is formed on the key top main body 2 made of a polycarbonate resin, heat transfer is carried out in the temperature range of 170° C. to 230° C. with a hot stamp machine of an updown type or a roll type.

Key Top Main Body 2

The key top main body 2 onto which the coloring agent layer 10 is transferred is a part of the key top 1 for a push-button switch excluding various functional layers such as the color design image layer 3 and the bonding layer 4. A resin is mainly used for the key top main body 2, and examples of the resin include various thermoplastic, thermosetting, moisture curable, and photocurable resins such as: a polycarbonate (PC) resin; an acrylic resin such as a polymethyl methacrylate (PMMA) resin; a polystyrene (PS) resin; an acrylonitrile-butadiene copolymer (AS) resin; a methyl methacrylate-styrene copolymer (MS) resin; a crystalline polyolefin resin; an epoxy resin; a polyester resin; a polyurethane resin; a polyamide resin; and a silicone resin. In the case where the color design image layer 3 is formed on the back surface 2*a* of the key top main body, a transparent or semi-transparent resin is selected from the above resins in order that the color design image layer 3 can be visually recognized. However, a resin besides a resin with high transparency can be used in such a form that the color design image layer 3 is formed on the surface of the key top main body 2. The key top main body 2 can be produced by charging a mold of a desired shape with a resin which is heated and melted via injection molding, compression molding, transfer molding, rotational molding, or the like, or with a liquid uncured resin, followed by hardening of the resin.

Transparent Resin Layer 5

The coloring agent layer 10 is formed by adhesion or permeation of ink from a printer or into the image carrying layer 8 which is porous. Therefore, the coloring agent layer is excellent in peeling property from the substrate sheet 9, that is, transfer property onto the key top main body 2. However, the coloring agent layer is peeled from the substrate sheet 9 on completion of the transfer. Therefore, there is a problem in that the coloring design image layer 3 appears to be poor in transparency in the case where the transferred image is observed as compared with the case where the printed image on the substrate sheet as it is observed. In other words, there is a problem in that the color design image layer 3 appears to be whitish or yellowish. Although the reason for the problem remains uncertain, the inventors of the present invention assume that light scattering in the color design image layer 3 using a porous material as a substrate has some effects. In view of the above, in order to obtain an image which has high transparency and is clear, the inventors of the present invention have applied a predetermined transparent resin liquid as follows onto the color design image layer 3, followed by leaving for a required time period determined according to the kind and viscosity of the transparent resin liquid. Thus, the problem in the decreased transparency is solved.

That is, after the color design image layer 3 is formed, a predetermined transparent resin liquid is applied onto the surface of the color design image layer 3 by means of various methods such as a screen printing method, a pad printing method, a spray coating method, a potting method, and application with a dispenser, followed by leaving for a predetermined time period. Then, the transparent resin liquid is deposited and-cured onto the color design image layer 3, thereby forming the transparent resin layer 5. The above procedure provides the transparent resin layer 5 which is laminated on the color design image layer 3 while penetrating into a gap of the color design image layer 3, thereby making it possible to obtain a color design image with high transparency. The transparent resin liquid has functions of making the color design image layer 3 transparent, of protecting the color design image layer 3, and of being an adhesive with the base sheet 6. In the present specification, in addition to "colorless and transparent", and "colored and transparent", "semi-transparent" may be included in the term "transparent" of the transparent resin liquid. However, a colorless and transparent or colored and transparent resin with high transparency is preferable.

In the case where an active energy ray curing type resin liquid such as an ultraviolet curing type resin liquid or an electron beam curing type resin liquid is used as the transparent resin liquid, a viscosity of the transparent resin liquid at 25° C. has only to fall within the range of $1\times10^{-3}$ Pa·s to 20 Pa·s. Therefore, many of generally used active energy ray curing type resin liquids can be used. That is, the color design image layer 3 can be made transparent even if an active energy ray curing type resin liquid that seems to have a low viscosity or a high viscosity is used. The viscosity should be $1\times10^{-3}$ Pa·s or more because a viscosity of less than $1\times10^{-3}$ Pa·s makes it difficult to carry out an application operation, and tends to cause liquid drop or leave stains to another part before being cured, resulting in deteriorated workability. Furthermore, a viscosity in excess of 20 Pa·s retards penetration into the image carrying layer 8, thereby making it difficult to obtain transparency of an image.

A time period for leaving after application in the case where an active energy ray curing type resin liquid is used is changed depending on its viscosity. That is, there is a correlation between the viscosity of the transparent resin liquid and the time period for leaving. If the viscosity at 25° C. ranges from $1\times10^{-3}$ Pa·s to $1\times10^{-2}$ Pa·s, the time period for leaving ranges from 0.1 seconds to 1 second. If the viscosity at 25° C. ranges from $1\times10^{-2}$ Pa·s to 0.1 Pa·s, the time period for leaving ranges from 0.5 seconds to 60 seconds. If the viscosity at 25° C. ranges from 0.1 Pa·s to 1.0 Pa·s, the time period for leaving ranges from 10 seconds to 10 minutes. If the viscosity at 25° C. ranges from 1.0 Pa·s to 5.0 Pa·s, the time period for leaving ranges from 1 minute to 60 minutes. If the viscosity at 25° C. ranges from 5.0 Pa·s to 20 Pa·s, the time period for leaving ranges from 10 minutes to 3 hours.

That is, in the case where an active energy ray curing type resin liquid is used, an effect is obtained in that the color design image layer 3 becomes transparent as long as the time period for leaving is set to be long even if a resin liquid to be used has a considerably high viscosity. Therefore, even in the case where the transparent resin layer 5 is allowed to function as a bonding layer for bonding the key top 1 for a push-button switch to the base sheet 6, after application of the transparent resin liquid, the base sheet 6 may be bonded, followed by leaving for a predetermined time period. Bonding and curing of the key top 1 to the base sheet 6 can be performed by applying an active energy ray after a lapse of the predetermined time period. However, in view of the fact that the steps from application to curing of the transparent resin liquid are performed in a series of production steps for the key pad 7 with a key top for a push-button switch, the viscosity of the active energy ray curing type resin liquid at 25° C. preferably ranges from $1\times10^{-2}$ Pa·s to 20.0 Pa·s, more preferably ranges from 0.1 Pa·s to 5.0 Pa·s. The reason why the viscosity within such a range is preferable is as follows. If the viscosity ranges from $1\times10^{-2}$ Pa·s to 20.0 Pa·s, the time period for leaving ranges from 0.5 seconds to 3 hours, and an operating time for penetration into the image carrying layer 8 is at an appropriate level. If the viscosity ranges from 0.1 Pa·s to 5.0 Pa·s, the time period for leaving ranges from 10 seconds to 60 minutes. Thus, operation efficiency is excellent and transparency is enhanced. The term "time period for leaving" of the transparent resin liquid in the above description refers to a time period when the transparent resin liquid is left at 25° C. The time period for leaving may vary if a temperature at which the transparent resin liquid is left is changed. Although the reason why leaving is necessary remains uncertain, penetration of a resin into a gap of the coloring agent layer 4 is expected to reduce light scattering, thereby making the coloring agent layer 10 transparent. Therefore, a time period enough for the transparent resin liquid to penetrate into the coloring agent layer 10 might be given.

An ultraviolet curing type resin liquid (UV curing type resin liquid) is composed of a photopolymerization initiator, and a reactive monomer or oligomer. Examples of the photopolymerization initiator include a benzophenone based photopolymerization initiator, a thioxanthone based photopolymerization initiator, an acetophenone based photopolymerization initiator, and an acylphosphine based photopolymerization initiator. Examples of the reactive monomer or oligomer include an acrylic monomer, urethane acrylate, epoxy acrylate, polyester acrylate, and cyanoacrylate. The ultraviolet curing type resin liquid may contain an additive, and examples of the additive include a silane coupling agent, a polymerization inhibitor, a leveling agent, a surface lubricant, an antifoaming agent, a light stabilizer, an antioxidant, an antistatic agent, and a filler. Furthermore, two or more kinds of resins may be mixed or may be diluted with an organic solvent for a viscosity adjustment or the like.

Furthermore, conditions for the viscosity and the time period for leaving in the case where a two-liquid curing type resin liquid is used as the transparent resin liquid are identical to those in the case where an active energy ray curing type resin liquid is used. However, the resin liquid must be such that curing of the two-liquid curing type resin liquid is completed after a lapse of the time period for leaving. This is because a color design image with good transparency cannot be obtained if curing is completed within a predetermined time period owing to the viscosity of the two-liquid curing type resin liquid.

It is not preferable to use a volatile solvent-diluted resin liquid as the transparent resin liquid. The reason for this is as follows. An experiment was performed by using a volatile solvent-diluted resin liquid with a resin solid content of 20 wt % to 70 wt %. In the case where the volatile solvent-diluted resin liquid was used, the solvent volatilized to cure the resin after application of the resin liquid (the resin was dried), with the result that the color design image layer 3 was not transparent. In order to make the color design image layer 3 transparent, repeated application of the resin liquid might be necessary.

A thickness of the color design image layer 3 is preferably of such thickness that a letter, a pattern, or the like is clearly displayed when a color design image is displayed in the key top, and that the transfer is not hindered. Thus, the thickness is preferably 1 to 50 μm.

Key Pad 7 with a Key Top for a Push-button Switch

A transparent resin liquid can be used as an adhesive for bonding the key top 1 for a push-button switch to the base sheet 6. In the case where an active energy ray curing type resin liquid or a thermosetting resin liquid is used, the resin liquid is applied onto the color design image layer 3. Then, the base sheet 6 is brought into contact with the surface of the layer, followed by leaving for a predetermined time period. Then, an active energy ray or heat is applied to the resin liquid for curing.

The key top 1 for a push-button switch in which the color design image layer 3 is formed is bonded to and integrated into the base sheet 6 utilizing a rubber-like elastic body such as natural rubber, styrene-butadiene rubber, silicone rubber, ethylene-propylene rubber, or a thermoplastic elastomer (hereinafter, referred to as "TPE"), thereby providing the key pad 7 with a key top for a push-button switch. Examples of the TPE include a styrene based TPE, an olefin based TPE, an ester based TPE, and a urethane based TPE.

Other Embodiments of FIGS. 9 to 18

A structure of a key top for a push-button switch obtained according to the method of producing a decorative molded object of the present invention, in particular, the method of producing a key top for a push-button switch is not limited to that shown in FIG. 1 described above. Hereinafter, a representative example of a key top for a push-button switch having a structure besides that shown in FIG. 1 will be shown, and a point of difference between the representative example and the key top 1 for a push-button switch shown in FIG. 1 will be described.

Figure 9:
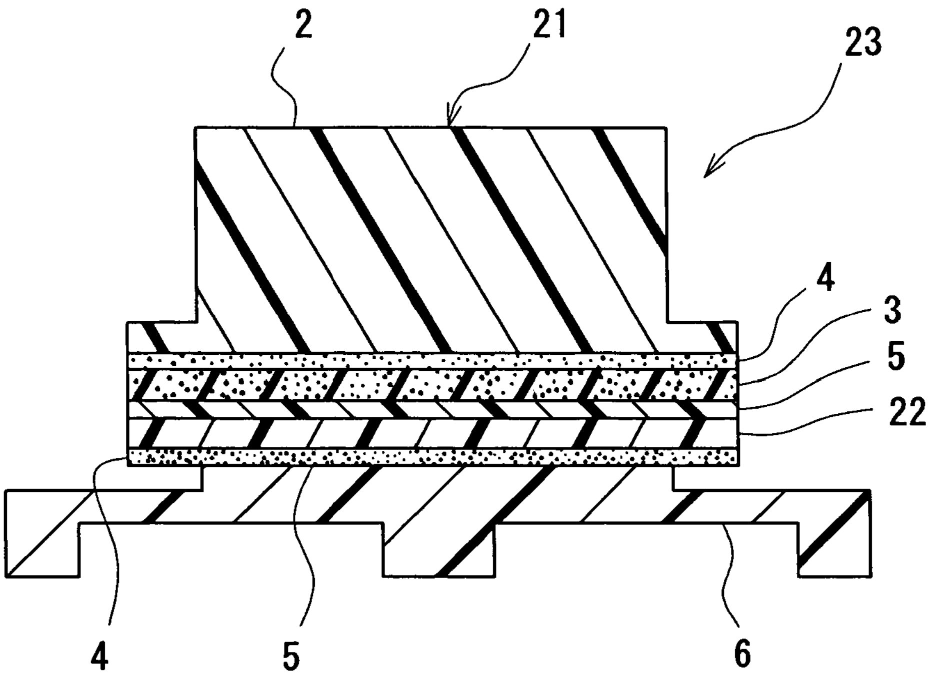
FIG. 9 is a cross sectional view of a key pad with a key top for a push-button switch using a key top for a push-button switch according to a second embodiment.

Second Embodiment of FIG. 9

A key top 21 for a push-button switch shown in FIG. 9 further has a coloring auxiliary layer 22 below the color design image layer 3. The coloring auxiliary layer 22 complements a color that is difficult to represent using a color printer such as a metallic color (for example, a gold color or a silver color), a white color, or a pearl color. The coloring auxiliary layer 22 improves visibility as it is hard to visually recognize the color design image layer 3 in the absence of the coloring auxiliary layer 22. Moreover, the coloring auxiliary layer 22 serves as a protective layer for preventing deterioration of the color design image layer 3 due to humidity or the like. The coloring auxiliary layer 22 can be formed by using a solvent vaporizing type ink that is obtained by dissolving, in one or two or more types of organic solvents, one type of resins such as an acrylic resin, a vinyl chloride resin, a vinyl acetate resin, a polyester resin, a urethane resin, and an epoxy resin, or a mixture of two or more types of the resins. Examples of the organic solvent include cyclohexanone, toluene, isophorone, xylene, ethyl acetate, isobutyl acetate, diethylene glycol monoethyl ether acetate, and diethylene glycol monobutyl ether acetate. The coloring auxiliary layer 22 can also be formed by transferring a metallic thin film layer or the like.

A translucent material is preferably used if an illumination type key top is to be prepared. A thickness of the coloring auxiliary layer 22 is preferably 1 to 30 μm. If the thickness is less than 1 μm, an effect of complementing a color such as a white color or a silver color is insufficient. On the other hand, if the thickness exceeds 30 μm, a coloring complementing effect receives no further improvement, and at the same time, translucency deteriorates. The coloring auxiliary layer 22 is formed by printing or the like after the formation of the transparent resin layer 5. The coloring auxiliary layer 22 may be formed by laminating layers of different colors. The key top 21 for a push-button switch shown in FIG. 9 can be bonded to and integrated into the base sheet 6 to provide a key pad 23 with a key top for a push-button switch.

Figure 10:
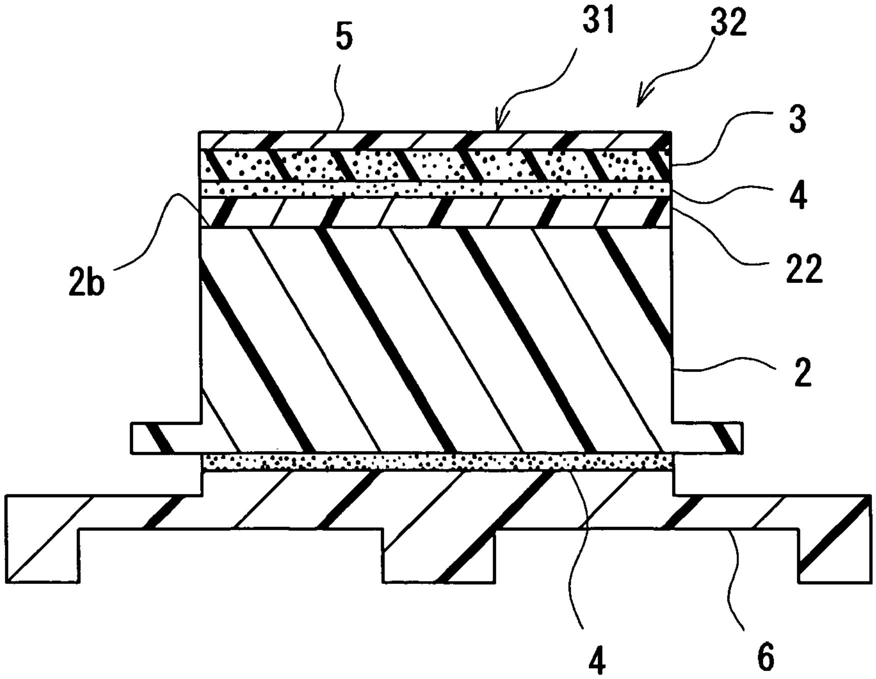
FIG. 10 is a cross sectional view of a key pad with a key top for a push-button switch using a key top for a push-button switch according to a third embodiment.

Third Embodiment of FIG. 10

In a key top 31 for a push-button switch shown in FIG. 10, the color design image layer 3 is formed on a surface 2*b* side of the key top main body 2 made of a resin. The coloring auxiliary layer 22 is also formed on the surface 2*b* side of the key top main body 2. The key top 31 for a push-button switch can be formed by applying the coloring auxiliary layer 22 onto the surface 2*b* side of the key top main body 2 and then by transferring the color design image layer 3 onto the coloring auxiliary layer 22. The key top 31 for a push-button switch can be bonded to and integrated into the base sheet 6 to provide a key pad 32 with a key top for a push-button switch.

Figure 11:
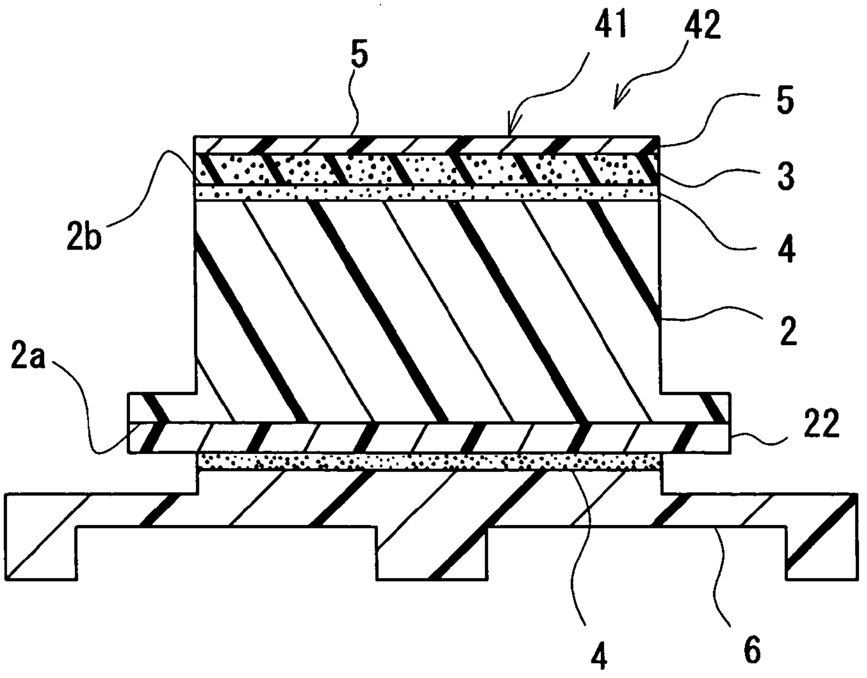
FIG. 11 is a cross sectional view of a key pad with a key top for a push-button switch using a key top for a push-button switch according to a fourth embodiment.

Fourth Embodiment of FIG. 11

A key top 41 for a push-button switch shown in FIG. 11 is provided with the coloring auxiliary layer 22 on the back surface 2*a* of the key top main body 2. The key top 41 has the same structure as that of the key top 31 for a push-button switch shown in FIG. 10 except that the coloring auxiliary layer 22 has shifted from the surface 2*b* of the key top main body to the back surface 2*a* of the key top main body. The key top 41 for a push-button switch can be bonded to and integrated into the base sheet 6 to provide a key pad 42 with a key top for a push-button switch.

Figure 12:
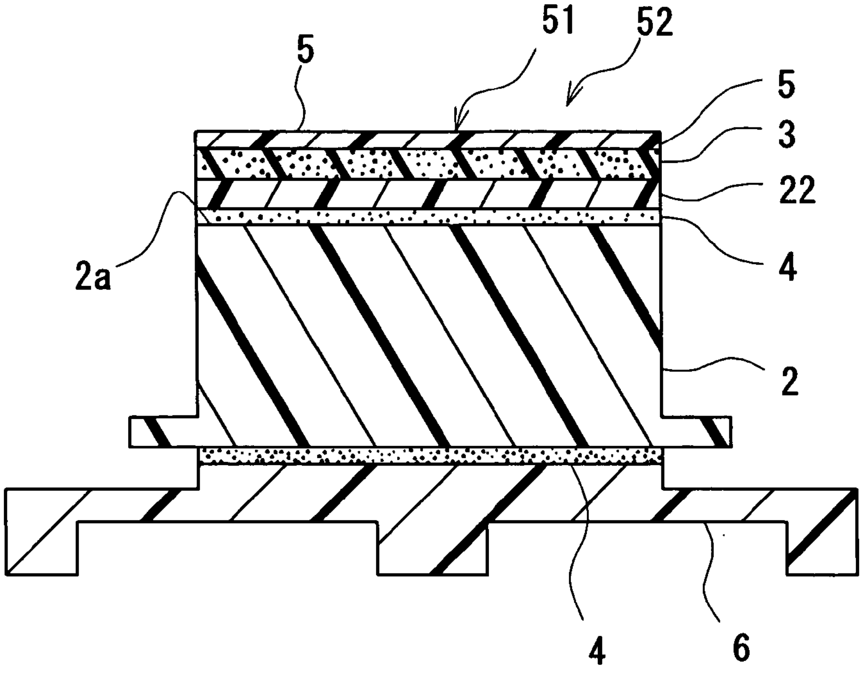
FIG. 12 is a cross sectional view of a key pad with a key top for a push-button switch using a key top for a push-button switch according to a fifth embodiment.

Fifth Embodiment of FIG. 12

A key top 51 for a push-button switch shown in FIG. 12 has the coloring auxiliary layer 22 laminated on the coloring agent layer 10. That is, the coloring agent layer 10 is formed on the substrate sheet 9. Then, the coloring auxiliary layer 22 is printed thereon, followed by transfer. The key top 51 for a push-button switch can be bonded to and integrated into the base sheet 6 to provide a key pad 52 with a key top for a push-button switch.

Sixth Embodiment of FIGS. 13 to 18

Figure 13:
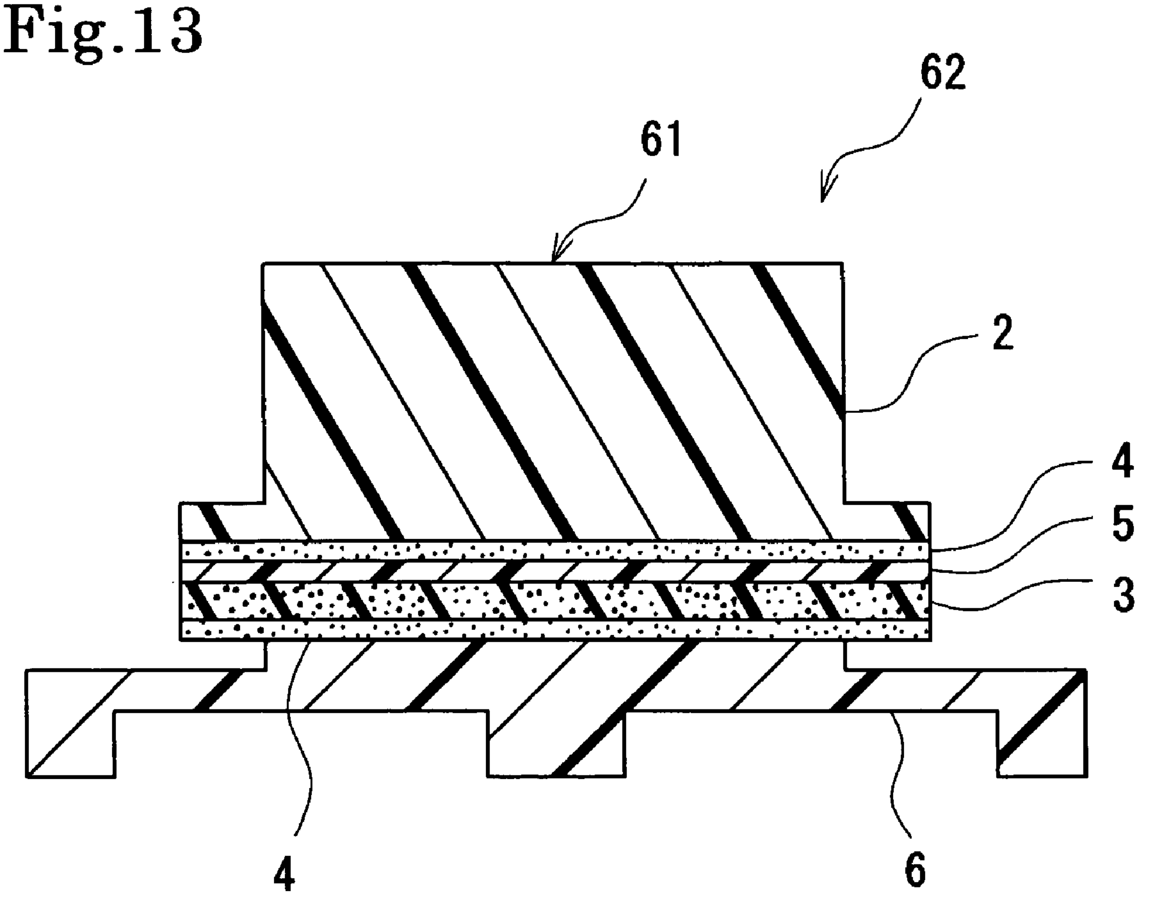
FIG. 13 is a cross sectional view of a key pad with a key top for a push-button switch using a key top for a push-button switch according to a sixth embodiment.
Figure 14:
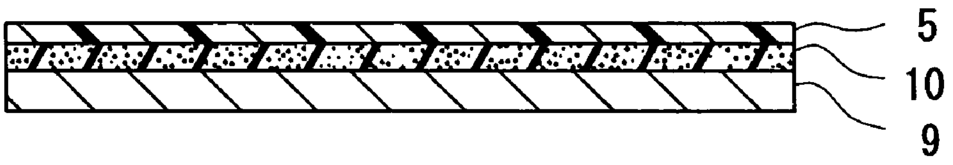
FIG. 14 is a cross sectional view showing a substrate sheet having a transparent resin layer formed on a coloring agent layer in a production process of the key top for a push-button switch shown in FIG. 13.
Figure 15:
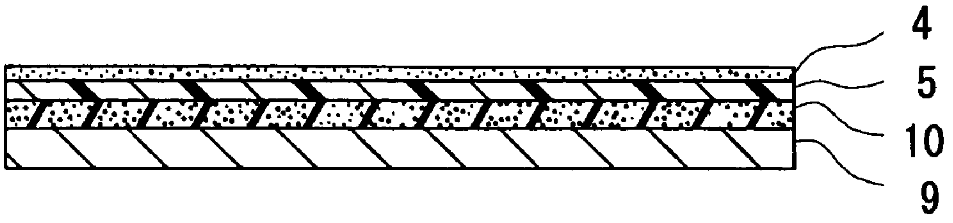
FIG. 15 is a cross sectional view showing the substrate sheet having a bonding layer formed on the transparent resin layer in the production process of the key top for a push-button switch shown in FIG. 13.
Figure 16:
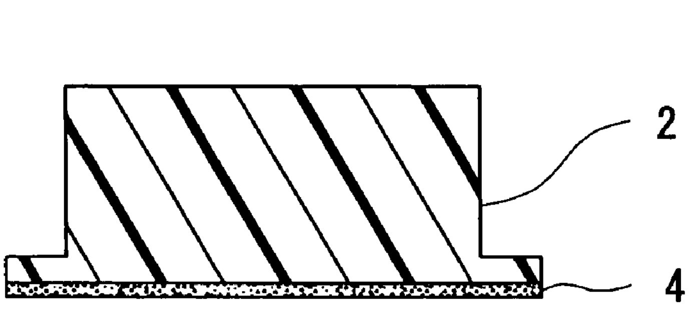
FIG. 16 is a cross sectional view showing a key top main body having a bonding layer formed thereon in the production process of the key top for a push-button switch shown in FIG. 13.
Figure 17:
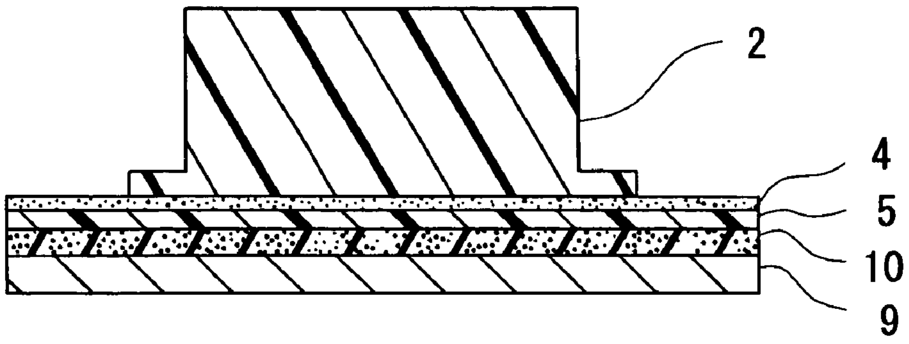
FIG. 17 is a cross sectional view showing a state where the key top main body is bonded to the substrate sheet in the production process of the key top for a push-button switch shown in FIG. 13.
Figure 18:
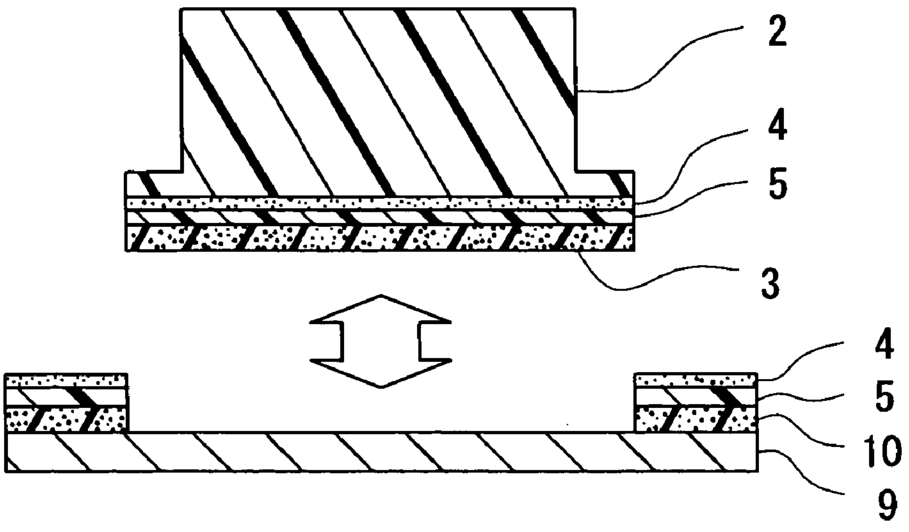
FIG. 18 is a cross sectional view showing a state where the coloring agent layer is transferred and a color design image layer is formed on a key top main body side in the production process of the key top for a push-button switch shown in FIG. 13.

A key top 61 for a push-button switch shown in FIG. 13 is obtained by a method in which the step of providing the transparent resin layer 5 is performed not after transfer of the coloring agent layer 10 onto the key top main body 2 but before the transfer. The key top 61 for a push-button switch is produced in the same manner as in the above examples up to the step of forming the coloring agent layer 10 (FIGS. 1 to 3). Subsequently, a transparent resin liquid having a predetermined viscosity is applied onto the surface of the coloring agent layer 10, followed by leaving for a predetermined time period determined according to the kind of viscosity of the transparent resin liquid. Next, the transparent resin layer 5 is formed while the transparent resin liquid is allowed to permeate into a porous material forming the coloring agent layer 10 (FIG. 14). Then, the adhesive 4 is applied onto the surface of the transparent resin layer 5 (FIG. 15). Alternatively, the adhesive 4 is applied onto the back surface 2*a* of the key top main body 2 (FIG. 16). The case where the adhesive is applied onto the surface of the transparent resin layer 5 is continuously described. The substrate sheet 9 is brought into press-contact with the key top main body 2 (FIG. 17). Then, the coloring agent layer 10 is transferred onto the key top main body 2 by using a method such as hot stamping, and the substrate sheet 9 is peeled (FIG. 18). In this way, the key top 61 for a push-button switch is produced. Moreover, bonding and curing of the key top 61 with the base sheet 6 results in a key pad 62 with a key top for a push-button switch (FIG. 13).

In addition to those shown in FIGS. 1 to 18, a key top for a push-button switch subjected to various modifications such as a change in layer structure and addition of a new functional layer can be used.

For instance, a mirror surface layer may be formed in each of the key tops 1, 21, 31, 41, 51, and 61 or a push-button switch. The mirror surface layer imparts a specular gloss to the key top, and can be formed by aluminization, foil transfer, printing of mirror ink, sputtering, or the like. The mirror surface layer may be arranged on an upper surface of each of the key tops 1, 21, 31, 41, 51, and 61 for a push-button switch, or may be arrange on a back surface thereof. Furthermore, the mirror surface layer can be formed as the coloring auxiliary layer 22.

A peeling layer for improving separation between the substrate sheet 9 and the coloring agent layer 10 may be formed on the substrate sheet 9. Furthermore, as required, an appropriate modification may be made. For example, a new layer may be provided in a part of the structure of each of the above key tops 1, 21, 31, 41, 51, and 61 for a push-button switch. More specifically, a protective layer for protecting the color design image layer 3 may be provided, or a weather-resistant resin layer containing an ultraviolet absorber may be provided. Furthermore, for example, a layer for displaying an arbitrary figure, pattern, color, or the like may be inserted between the bonding layer 4 and the key top main body 2 of the key top 1 for a push-button switch. Alternatively, a layer for displaying a figure, a pattern, a color, or the like may be formed individually of the color design image layer 3.

Although the key tops 1, 21, 31, 41, 51, and 61 for a push-button switch have been described above as specific examples of the decorative molded object, a case of a mobile telephone can also be given as an example except the key tops 1, 21, 31, 41, 51, and 61 for a push-button switch. That is, if an outer case of a mobile telephone is made from a resin and a coloring agent layer formed by using a printer is transferred onto the outer case, a decorative molded object as a case of a mobile telephone having a color design image layer on its surface can be obtained. Thus, the present invention should not be construed to be limited to a key top for a push-button switch. The present invention can be applied to a decorative molded object in which a color design image layer with a display function and a decoration function for displaying a color design image is formed on a resin molded object or a metal molded object made of a solid such as a resin or a metal and serving as a partial structure of various products.

According to the decorative molded object and the method of producing the same of the present invention, a decorative molded object such as a key top for a push-button switch can be obtained. The decorative molded object to be obtained has a color design image layer capable of representing a large number of letters, symbols, or the like in a small area portion and of displaying a figure pattern, a color pattern, or the like which is fine, complex, and excellent in design property. In addition, in the decorative molded object to be obtained, the color design image layer has high transparency.

EXAMPLE

Example 1 of FIG. 1

Color design data produced by using a personal computer was printed on paper exclusive for an ink jet printer (a sheet having, on a substrate sheet (9) with a thickness of 140 μm made of a polyester film, an image carrying layer (8) with a thickness of 20 μm formed by using boehmite as an inorganic fine particle and polyvinyl alcohol as a binder for bonding the boehmite) by using an ink jet printer "PM 890" (manufactured by Seiko Epson Corporation), thereby forming a coloring agent layer (10) on the substrate sheet (9). Genuine ink for the printer was used as ink for printing. In the meantime, by screen printing, acrylic evaporation drying type ink "CAV Meiban" (manufactured by Seiko Advance Ltd.) was evenly applied onto a back surface (2*a*) of a key top main body (2) made of a polycarbonate resin molded by an injection molding method in such a manner that a thickness of the ink would be 5 μm. After that, the key top main body (2) was aligned with the substrate sheet (9) in such a manner that the coloring agent layer (10) would be transferred onto the back surface (2*a*) of the key top main body. Then, a color design image layer (3) was formed on the back surface (2*a*) of the key top main body (2) by hot stamping under conditions of a transfer temperature of 190° C. and a transfer speed of 5 cm/sec by a roll type hot stamp. Subsequently, a predetermined transparent resin liquid was applied onto the surface of the color design image layer (3) by screen printing, was left for a predetermined time period, and was then cured by a method according to the kind of the transparent resin liquid. In this way, a key top (1) for a push-button switch using each of samples 1 to 14 shown in Table 1 was obtained. The transparent resin liquids used and the conditions such as the time period for leaving were shown in Table 1.

Comparative Example 1 of FIG. 1

A key top for a push-button switch using each of samples 51 to 66 was produced in the same manner as in Example 1 except that the kind, viscosity, time period for leaving after application, and curing condition of a transparent resin liquid were altered as shown in Table 2 as compared to the key top (1) for a push-button switch produced in Example 1. The transparent resin liquids used and the conditions such as the time period for leaving were shown in Table 2.

TABLE 1

| Sample No. | Transparent resin liquid (Reactive monomer etc.) (Weight ratio) | Addition amount of polymerization initiator | Kind of transparent resin liquid | Viscosity (Pa · a) (25° C.) | Time period for leaving (25° C.) | Curing condition | Transparency |
|---|---|---|---|---|---|---|---|
| Sample 1 | M-150 | 2/100 | UV curing type | 0.002 | 1 second | Application of UV | ○ |
| Sample 2 | BP4PA/M-150 (10/10) | 2/100 | UV curing type | 0.203 | 25 seconds | Application of UV | ○ |
| Sample 3 | M8060/M-150 (10/10) | 2/100 | UV curing type | 0.206 | 14 seconds | Application of UV | ○ |
| Sample 4 | M-305 | 2/100 | UV curing type | 0.563 | 30 seconds | Application of UV | ○ |
| Sample 5 | BP4PA/M-305 (10/10) | 2/100 | UV curing type | 1.13 | 80 seconds | 80° C., 30 minutes + Application of UV | ○ |
| Sample 6 | M8060/M-305 (10/10) | 2/100 | UV curing type | 1.43 | 2 minutes 50 seconds | Application of UV | ○ |
| Sample 7 | M-1200/M-150 (10/5) | 3/150 | UV curing type | 1.76 | 5 minutes 25 seconds | Application of UV | ○ |
| Sample 8 | BP4PA | 2/100 | UV curing type | 1.8 | 2 minutes | Application of UV | ○ |
| Sample 9 | M-1200/M-150 (10/4) | 2/100 | UV curing type | 1.95 | 3 minutes | Application of UV | ○ |
| Sample 10 | M8060/BP4PA (10/10) | 2/100 | UV curing type | 3.59 | 5 minutes 20 seconds | Application of UV | ○ |
| Sample 11 | M-1200/cyclohexane (10/5) | 3/150 | UV curing type | 4.06 | 5 minutes 40 seconds | Application of UV | ○ |
| Sample 12 | M-8060 | 2/100 | UV curing type | 7.58 | 17 minutes | Application of UV | ○ |
| Sample 13 | M-1200 | 2/100 | UV curing type | 170 | About 47 hours (170,000 seconds) | Application of UV | ○ |
| Sample 14 | U-53/D-177N (10/5.6) | — | Two-liquid curing Type | 1.72 | 4 minutes 45 seconds | Air Drying | ○ |

TABLE 2

| Sample No. | Transparent resin liquid (Reactive monomer etc.) (Weight ratio) | Addition amount of polymerization initiator | Kind of transparent resin liquid | Viscosity (Pa · a) (25° C.) | Time period for leaving (25° C.) | Curing condition | Transparency |
|---|---|---|---|---|---|---|---|
| Sample 51 | M-8060 | 2/100 | UV curing type | 7.58 | 10 minutes | Application of UV | x |
| Sample 52 | CAV Meiban | — | Volatile solvent-diluted type (Solid content 23%) | 1.5 | 10 minutes | 60° C., 30 minutes (Drying Condition) | x |
| Sample 53 | SG-740 | — | Thermosetting type (Solid content 27%) | 1.1 | 10 minutes | 80° C., 30 minutes | x |
| Sample 54 | BP4PA/M-150 (10/10) | 2/100 | UV curing type | 0.203 | 5 seconds | Application of UV | x |
| Sample 55 | M8060/M-150 (10/10) | 2/100 | UV curing type | 0.206 | 5 seconds | Application of UV | x |
| Sample 56 | M-305 | 2/100 | UV curing type | 0.563 | 5 seconds | Application of UV | x |
| Sample 57 | BP4PA/M-305 (10/10) | 2/100 | UV curing type | 1.13 | 40 seconds | 80° C., 30 minutes + Application of UV | |
| Sample 58 | M8060/M-305 (10/10) | 2/100 | UV curing type | 1.43 | 40 seconds | Application of UV | x |
| Sample 59 | M-1200/M-150 (10/5) | 3/150 | UV curing type | 1.76 | 40 seconds | Application of UV | x |
| Sample 60 | BP4PA | 2/100 | UV curing type | 1.8 | 40 seconds | Application of UV | x |
| Sample 61 | M-1200/M-150 (10/4) | 2/100 | UV curing type | 1.95 | 40 seconds | Application of UV | x |
| Sample 62 | M8060/BP4PA (10/10) | 2/100 | UV curing type | 3.58 | 50 seconds | Application of UV | x |
| Sample 63 | M-1200/cyclohexane (10/5) | 3/150 | UV curing type | 4.06 | 50 seconds | Application of UV | x |
| Sample 64 | M-8060 | 2/100 | UV curing type | 7.58 | 3 minutes | Application of UV | x |
| Sample 65 | M-1200 | 2/100 | UV curing type | 170 | 5 hours | Application of UV | x |
| Sample 66 | U-53/D-165N (10/6.5) | — | Two-liquid curing Type | 5.35 | 40 seconds | Air Drying | x |

Every UV curing type resin liquid contains, as a photopolymerization initiator, "Irgacure 651" (2,2-dimethoxy-1,2-diphenylethane-1-one): manufactured by Ciba-Geigy Japan Limited. An addition amount of the initiator is also shown in Tables 1 and 2. The term "addition amount of polymerization initiator" in each of Tables 1 and 2 refers to an addition amount (part by weight) per reactive monomer or oligomer. For example, "2/100" in the sample 4 indicates that 2 parts by weight of "Irgacure 651" is mixed with 100 parts by weight of "M-305".

The transparent resin liquids shown in Tables 1 and 2 (the kind of reactive monomer or oligomer for an UV curing type resin liquid) are as follows.

"M-305" is an abbreviation for an acrylic monomer (pentaerythritol triacrylate) 'ARONIX M-305' manufactured by Toagosei Co., Ltd.

"BP4PA" is an abbreviation for an acrylic monomer (PO-modified bisphenol A diacrylate) 'Light-Acrylate BP-4PA' manufactured by Kyoeisha Chemical Co., Ltd.

"M-8060" is an abbreviation for polyester acrylate 'ARONIX M-8060' manufactured by Toagosei Co., Ltd.

"M-1200" is an abbreviation for urethane acrylate 'ARONIX M-1200' manufactured by Toagosei Co., Ltd.

"M-150" is an abbreviation for N-vinyl-2-pyrrolidone 'ARONIX M-150' manufactured by Toagosei Co., Ltd.

"Cyclohexanone" is a reagent chemical manufactured by Wako Pure Chemical Industries, Ltd.

"U-53" is an abbreviation for polyester polyol 'U-53' (solid content 100%) manufactured by Mitsui Takeda Chemicals, Inc.

"D-177N" is an abbreviation for isocyanate 'D-177N' (solid content 100%) manufactured by Mitsui Takeda Chemicals, Inc.

"CAV Meiban" is an abbreviation for an acrylic evaporation drying type ink (volatile solvent-diluted resin liquid) 'CAV Meiban' manufactured by Seiko Advance Ltd.

"SG-740" is an abbreviation for a thermosetting ink (thermosetting resin liquid) 'SG-740' manufactured by Seiko Advance Ltd.

"D-165N" is an abbreviation for isocyanate 'D-165N' (solid content 100%) manufactured by Mitsui Takeda Chemicals, Inc.

Each key top for a push-button switch using the samples 1 to 14 and 51 to 66 obtained in Example 1 and Comparative Example 1 was evaluated for transparency of the color design image layer (3) as follow. First, at least three samples identical to each sample were prepared. One sample was not processed to leave as it is. In another sample, white ink was additionally applied onto a transparent resin layer (5) obtained by curing the transparent resin liquid to form a white layer. In the other sample, an aluminum foil layer was formed on the transparent resin layer (5). The color design image layers (3) in the three samples for evaluation prepared in this way were visually compared with one another. The case in which a color tone of the sample without the white layer was the same as that of the sample with the white layer, and the sample with the aluminum foil layer appearing like a mirror surface was evaluated as "O". The other cases each were evaluated as "x". The results of evaluation were also shown in Tables 1 and 2.

Example 2 of FIG. 9

The acrylic evaporation drying type ink "CAV Meiban" (manufactured by Seiko Advance Ltd.) was evenly applied onto a surface on which formed was the transparent resin layer (5) of the key top (1) for a push-button switch obtained in Example 1 by using each of the samples 1 to 14. After that, an aluminum foil sheet was transferred onto the surface. The resultant key top (21) for a push-button switch was evaluated for transparency of the color design image layer (3) in the same manner as in Example 1. As a result, the transparency was evaluated as "O" in all cases. The aluminum foil sheet used in Example 2 was prepared by printing a silicone based releasing layer (10 μm in thickness) and an epoxyacrylic protective layer (1 μm in thickness) onto a PET film with a thickness of 20 μm, forming an inorganic thin film layer with a thickness of 40 μm made of aluminum thereon by vapor deposition, forming a transparent elastic layer of vinyl chloride-vinyl acetate based ink on the inorganic thin film layer, and printing an acrylic transparent elastic layer thereon. In addition, the aluminum foil peels from the PET film through the transfer.

Example 3 of FIG. 13

Color design data produced using a personal computer was printed on paper exclusive for an ink jet printer (a sheet having, on a substrate sheet (9) with a thickness of 140 μm made of a polyester film, an image carrying layer (8) with a thickness of 20 μm made of a porous material in which a xerogel prepared by removing a solvent from a silica-alumina composite sol was used as an inorganic fine particle and was bound by polyvinyl alcohol) by using the ink jet printer "PM 890" (manufactured by Seiko Epson Corporation), thereby forming a coloring agent layer (10) for constituting an image composed only of a letter on the substrate sheet (9). Genuine ink for the printer was used as ink for printing. Then, the same transparent resin liquid as that used in the sample 4 of Example 1 was applied onto the surface of the coloring agent layer (10) by a screen printing method, was left for 30 seconds, and was cured through application of ultraviolet light. In the meantime, acrylic evaporation drying type ink "CAV Meiban" (manufactured by Seiko Advance Ltd.) was evenly applied onto a back surface (2*a*) of a key top main body (2) made of a polycarbonate resin molded by an injection molding method in such a manner that a thickness of the ink would be 5 μm. After that, the key top main body (2) was aligned with the substrate sheet (9) in such a manner that a transparent resin layer (5) and the coloring agent layer (10) would be transferred onto the back surface (2*a*) of the key top main body (2). Then, the layers were transferred onto the back surface (2*a*) of the key top main body (2) by hot stamping under conditions of a transfer temperature of 190° C. and a transfer speed of 5 cm/sec by a roll type hot stamp, thereby forming a color design image layer (3). As a result, a key top (61) for a push-button switch was obtained. The key top (61) for a push-button switch was evaluated for transparency of the color design image layer (3) as in Example 1, and the transparency was evaluated as "O".

As can be seen from the evaluation of transparency shown in Examples 1 to 3 and Comparative Example, a key top for a push-button switch having a color design image layer with high transparency was able to be obtained by applying a transparent resin liquid onto a color design image layer (or a coloring agent layer), leaving the transparent resin liquid for a predetermined time period determined according to the kind and viscosity of the transparent resin liquid, and then curing the transparent resin liquid.

What is claimed is:

1. A method of producing a decorative molded object which is a resin molded object decorated with a color design image representing a letter, a symbol, and a figure comprising the steps of:

printing a color design image on an image carrying layer, which is composed of a porous material having, as a bonding phase, inorganic fine particles bound with each other with a binder resin and is arranged on a substrate sheet, with an output apparatus that collectively outputs color design data to form a coloring agent layer for displaying the color design image on the substrate sheet;

curing, after application and deposition onto the coloring agent layer, a transparent resin liquid to thereby form a transparent resin layer;

transferring the transparent resin layer and the coloring agent layer on the substrate sheet onto a resin molded object to be decorated; and peeling the substrate sheet with the transferred coloring agent layer left on the resin molded object to form a color design image layer on the resin molded object.

* * * * *